US008392260B2

(12) United States Patent
Richardson (10) Patent No.: US 8,392,260 B2
(45) Date of Patent: Mar. 5, 2013

(54) SHORT-CHARGE CORDLESS SCANNER FOR RETAIL TERMINALS

(75) Inventor: Neil Richardson, San Jose, CA (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 131 days.

(21) Appl. No.: 12/871,265

(22) Filed: Aug. 30, 2010

(65) Prior Publication Data

US 2012/0054048 A1    Mar. 1, 2012

(51) Int. Cl.
*G06K 7/10* (2006.01)

(52) U.S. Cl. .... 705/20; 705/21; 340/572.8; 235/462.25; 235/375

(58) Field of Classification Search ............ 705/20, 705/14.4, 26.8, 21, 16; 235/383, 462.14, 235/435, 380; 340/572.8
See application file for complete search history.

(56) References Cited

U.S. PATENT DOCUMENTS

| | | | |
|---|---|---|---|
| 4,471,218 A | 9/1984 | Culp | |
| 5,189,291 A * | 2/1993 | Siemiatkowski | ........ 235/462.45 |
| 5,233,169 A | 8/1993 | Longacre, Jr. | |
| 5,578,834 A | 11/1996 | Trobridge | |
| 5,625,180 A | 4/1997 | Hanson et al. | |
| 5,664,231 A * | 9/1997 | Postman et al. | ................ 710/73 |
| 5,929,425 A | 7/1999 | Kanno | |
| 6,119,944 A | 9/2000 | Mulla et al. | |
| 6,739,514 B2 | 5/2004 | Sanders et al. | |
| 7,609,406 B2 * | 10/2009 | Roth et al. | .................. 358/1.15 |
| 7,954,719 B2 * | 6/2011 | Zhu et al. | ................. 235/462.42 |
| 2005/0004838 A1 * | 1/2005 | Perkowski et al. | ............. 705/14 |
| 2006/0085293 A1 | 4/2006 | Melucci | |
| 2006/0105722 A1 * | 5/2006 | Kumar | .......................... 455/90.3 |
| 2007/0057050 A1 * | 3/2007 | Kuhno et al. | ................. 235/383 |
| 2007/0290043 A1 * | 12/2007 | Russell et al. | ........... 235/462.14 |
| 2009/0014525 A1 | 1/2009 | Gillet et al. | |
| 2009/0090780 A1 | 4/2009 | Clark et al. | |
| 2009/0094100 A1 * | 4/2009 | Xavier | ............................ 705/10 |
| 2009/0134221 A1 * | 5/2009 | Zhu et al. | ...................... 235/383 |

* cited by examiner

*Primary Examiner* — Vanel Frenel (74) *Attorney, Agent, or Firm* — Heslin Rothenberg Farley & Mesiti P.C.

(57) ABSTRACT

A bar code reading terminal includes a cordless optical reader. The optical reader includes a microprocessor, a scan engine coupled to the microprocessor, a hand held housing supporting the scan engine, program memory coupled to the microprocessor, a decode processor circuit coupled to the microprocessor, and a short-cycle energy storage device coupled to the microprocessor. The energy storage device has high power density and low energy density. In one embodiment, the short-cycle energy storage device comprises a power density greater than 1 kW/kg. The bar code reading terminal further includes a base unit having a housing that includes a socket for receiving the hand held housing. The socket has a connector to facilitate transfer of bar code data messages from the hand held optical reader to the base unit. The connector also transfer powers from the base unit to the short-cycle energy storage device.

20 Claims, 6 Drawing Sheets

SHORT-CHARGE CORDLESS SCANNER FOR RETAIL TERMINALS

FIELD OF THE INVENTION

This disclosure relates generally to optical devices in general and, more specifically, to a bar code reading terminal having a cordless hand held optical reader with a base unit.

BACKGROUND OF THE INVENTION

In various commercial and industrial environments, the use of optical indicia, such as bar code symbols, has become the norm for identifying products and inventory. Typically, each item is marked with optical indicia associated with a description of the item and other attributes (for example, price) that are stored in a database of a host device or network system. Optical readers are used to read the optical indicia and provide that reading as input information to host devices. In some cases, the data is provided to the host devices via base units, which communicate with the optical reader. Examples of host devices include a computer (fixed or portable), a personal digital assistant (PDA), a portable data terminal (PDT), a point of sale (POS) terminal, a transaction terminal, cash register, or similar device. Checkout stations in retail settings typically employ stationary presentation-type optical readers, mobile hand held optical readers hardwired to a base unit, mobile wireless hand held optical readers that communicate wirelessly with a linked base unit, or some combination of the above to read optical indicia such as bar code symbols, or bar codes.

Stationary presentation-type optical readers, such as flat bed scanners, typically require a cashier to manually move an item bearing optical indicia into the field of view of the optical reader and orient the item such that the optical reader can scan the information and communicate this information to the cash register. While stationary presentation-type optical readers may be adequate for scanning encoded optical indicia on small items that are easily moved through their field of view by a cashier or other operator, these types of optical readers are not well suited for scanning large or heavy items that need to be repositioned by the cashier or customer so the scanner can read the optical indicia. This movement of large and/or heavy objects is inherently risky and undesirable. Furthermore, since stationary presentation-type optical readers require that the cashier position the item to be scanned somewhat precisely into the field of view of the optical reader so that the optical reader can scan the optical indicia, multiple attempts are often required to achieve a successful scan. This can lead to frustration by the cashier and customer and thus detract from customer satisfaction.

An advance upon the stationary presentation-type optical scanner is the use of a mobile hand held optical reader hardwired to a linked base unit. This configuration permits the cashier to manually move the hand held optical reader into position to scan an item's optical indicia, rather than having to move the item into the field of view of the optical reader as in the stationary presentation-type optical scanner. The scanned information from the optical indicia is then transmitted to the hand held optical reader's linked base unit via the hardwired connection between the two components. The base unit then communicates this information to the cash register. Alternatively, the hand held optical reader can be connected directly to the cash register. Unfortunately, this approach does not eliminate the problems associated with scanning items that are out of reach of the hardwired hand held optical reader and must be repositioned into the field of view of the optical reader so that the optical reader can scan the optical indicia. One approach to solve this access problem was to provide longer cords to the hardwired optical reader. However, the extra length must be stowed when not in use, which delays the time between scans, and may further detract from customer satisfaction.

In order to eliminate the limitations imposed by hardwiring the hand held optical reader to its base unit, another approach is the use of a wireless optical reader that can communicate wirelessly with its linked base unit. In this approach, the wireless hand held optical reader is held in a base unit or docking cradle until needed to read optical indicia that are out of the view of a stationary presentation-type optical reader. The wireless optical reader houses a battery to power the optical reader's internal electronics. The cashier can manually move the hand held optical reader into position to scan an item's optical indicia as long as the optical reader is within a distance where it can communicate wirelessly with its linked base unit. The scanned information is then transmitted to the hand held optical reader's linked base unit over the wireless connection. The base unit then communicates this bar code information to the cash register.

One noted problem with wireless mobile hand held optical readers that communicates wirelessly with its individual base unit is that the power requirements to transmit the data is substantial. Accordingly, the batteries in the hand held unit were large, heavy, and recharged very slowly. The batteries made the hand held optical reader difficult to wield, and caused wrist fatigue over the course of a working day.

SUMMARY OF THE INVENTION

It would thus be desirable in some instances to have a cordless bar code scanner that is light-weight and recharges quickly. In one aspect of the invention, a bar code reading terminal includes a cordless optical reader. The optical reader includes a microprocessor, a scan engine coupled to the microprocessor, a hand held housing supporting the scan engine, program memory coupled to the microprocessor, a decode processor circuit coupled to the microprocessor, and a short-cycle energy storage device coupled to the microprocessor. The energy storage device has high power density and low energy density.

The bar code reading terminal further includes a base unit having a housing that includes a socket for receiving the hand held housing. The socket has a connector to facilitate transfer of bar code data messages from the hand held optical reader to the base unit. The connector also transfer powers from the base unit to the short-cycle energy storage device.

In another aspect of the invention, a retail store network is provided that includes a plurality of point of sale stations wherein at least one of the point of sale stations includes a bar code reading terminal having a hand held optical reader and a base unit. The optical reader includes a microprocessor, a scan engine coupled to the microprocessor, a hand held housing supporting the scan engine, program memory coupled to the microprocessor, a decode processor circuit coupled to the microprocessor, and a short-cycle energy storage device coupled to the microprocessor. The short-cycle energy storage device has a power density greater than 1 kW/kg. The base unit includes a housing having a socket for receiving the hand held housing. The socket has a connector to facilitate transfer of bar code data messages from the hand held optical reader to the base unit. The connector also transfers power from the base unit to the short-cycle energy storage device.

The retail store network further includes a host device coupled to the base unit of the bar code reading terminal. The host device is configured to accept decoded message data from the base unit. The retail store network further includes a server coupled to the host device through a network backbone for processing the decoded message data, and a price lookup table coupled to the server to associate pricing with the decoded message data.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Reference will now be made in detail to the present embodiments of the invention, examples of which are illustrated in the accompanying drawings. Whenever possible, the same reference numerals will be used throughout the drawings to refer to the same or like parts for clarity.

Figure 1:
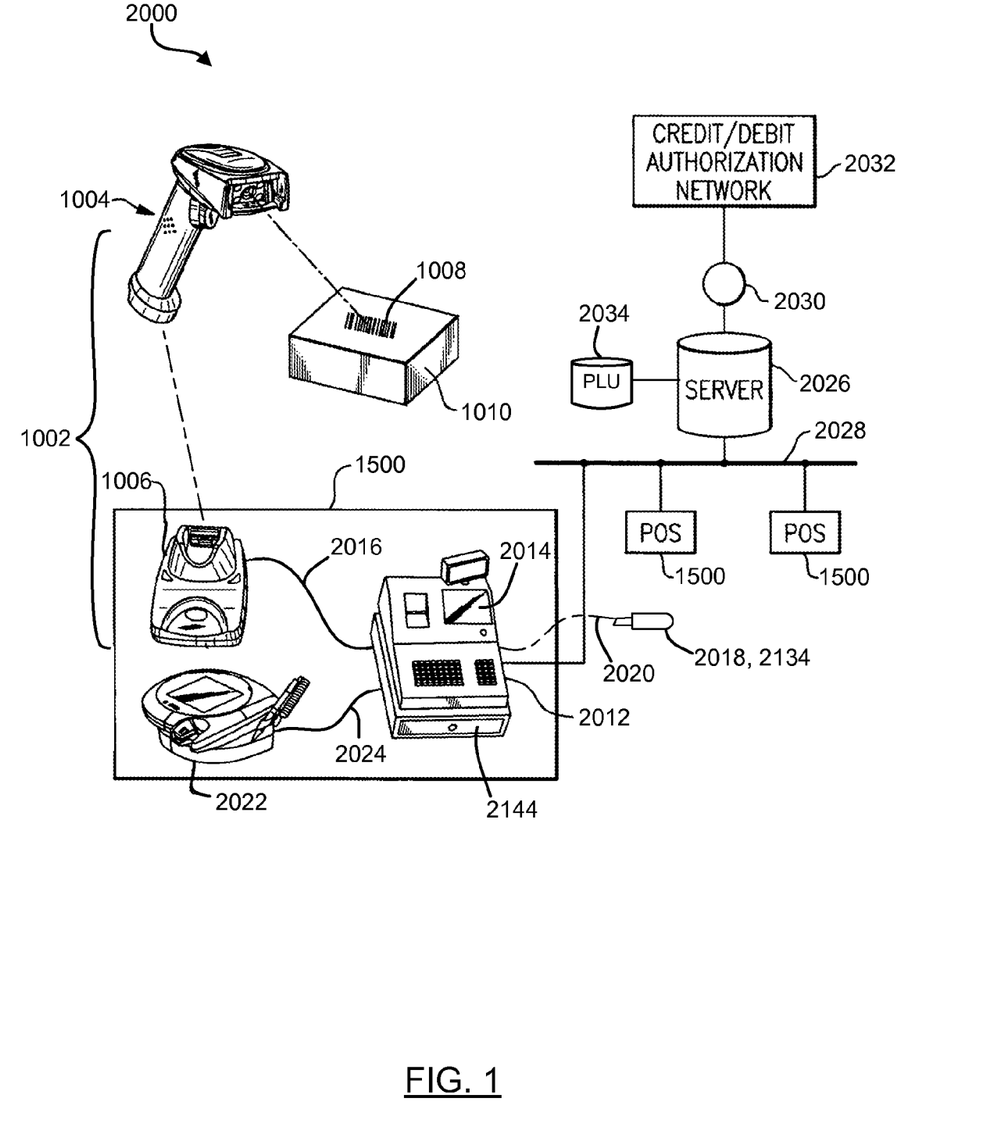
FIG. 1 is a block diagram of a typical retail store network in which an embodiment of the present invention can be used.

As shown in FIG. 1, the present invention can be used as part of a retail store network 2000 at a point of sale (POS) station 1500. The illustrative retail store network 2000 can include a bar code reading terminal 1002 that includes a hand held optical reader 1004 and a base unit 1006. In the environment shown, hand held optical reader 1004 may be a low cost reader that is devoid of a display. The hand held optical reader 1004 is adapted to scan a bar code symbol 1008 affixed to an item 1010. The optical reader 1004 decodes the information contained in the bar code symbol 1008, and communicates the decoded bar code data associated with that item 1010 to the base unit 1006 linked with the hand held optical reader 1004. The base unit 1006 then communicates that bar code data message to a host device such as a cash register 2012, which can also be located at the point of sale station 1500. The cash register 2012 of retail store network 2000 can be commonly provisioned, such as having a display 2014. However, the cash register can take on alternative forms. In one example, the base unit 1006 communicates the bar code data message to the cash register 2012 via a hardwired connection 2016 to the computer of the cash register 2012, such as, for example, a USB connection or a RS-232 serial connection.

In another example, the base unit 1006 may communicate with the cash register 2012 wirelessly. A radio transceiver 2018 of cash register 2012 may be in the form of a USB dongle Network Interface Card (NIC) plugged into the back of the cash register 2012 as is indicated by arrow 2020. In another example, not illustrated, a radio transceiver of the cash register can be in the form of a PC card Network Interface Card (NIC) plugged into a bus internally disposed within the cash register housing.

In addition to the hand held optical reader 1004, base unit 1006, and cash register 2012, the point of sale station 1500 may also include a transaction terminal 2022 that is also connected to the cash register 2012 via a second hardwired connection 2024 to the computer of the cash register, such as, for example, a USB connection or a RS-232 serial connection. The transaction terminal 2022 allows a customer to use a credit card or debit card, electronic benefits card, or customer loyalty card during or to complete a transaction at the point of sale station 1500. In order to process the customer transaction, the transaction terminal 2022 is connected to an in-store server 2026 through a network backbone 2028 such as may be provided by an Ethernet cable. The server 2026 may, through an appropriately configured gateway 2030, be in communication with a credit/debit authorization network 2032.

The store server 2026 incorporates a price lookup table (PLU) 2034. Store server 2026 is typically located locally on-site at a retail store while credit/debit authorization network 2032 is typically located off-site remote from a retail store. When a customer purchases an item 1010 (e.g., a box of cereal), hand held optical reader 1004 is used to read a bar code 1008 printed on the item. Decoded out message data is sent to store server 2026 and is used to access a price from the price lookup table 2034. A price for the item is sent to cash register 2012 which may associate the price with credit card data for the customer accessed by reading a credit card number with use of the transaction terminal 2022. Cash register 2012 may send transaction data (including price and credit card data) to credit authorization network 2032 for credit authorization. Network 2032, if a transaction is approved, credits and debits appropriate account databases and returns a credit approved message to cash register 2012.

Figure 2:
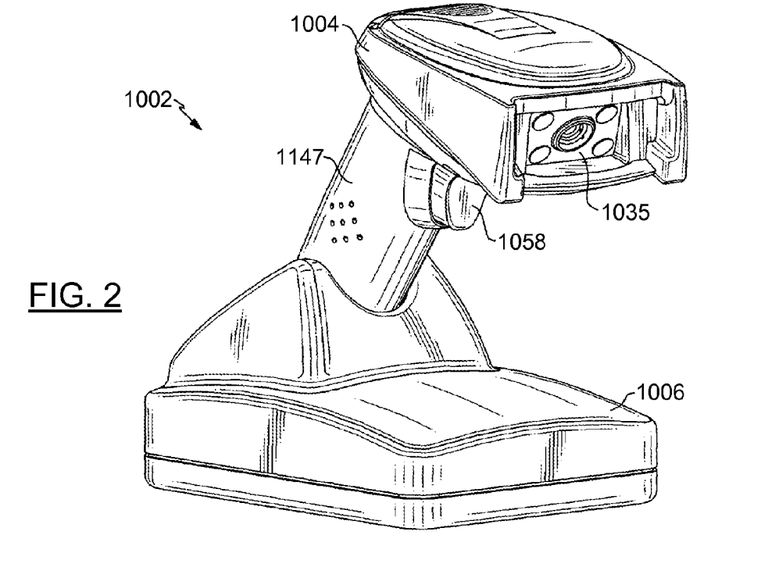
FIG. 2 is a perspective view of the bar code reading terminal of FIG. 1 according to one embodiment of the present invention.
Figure 3:
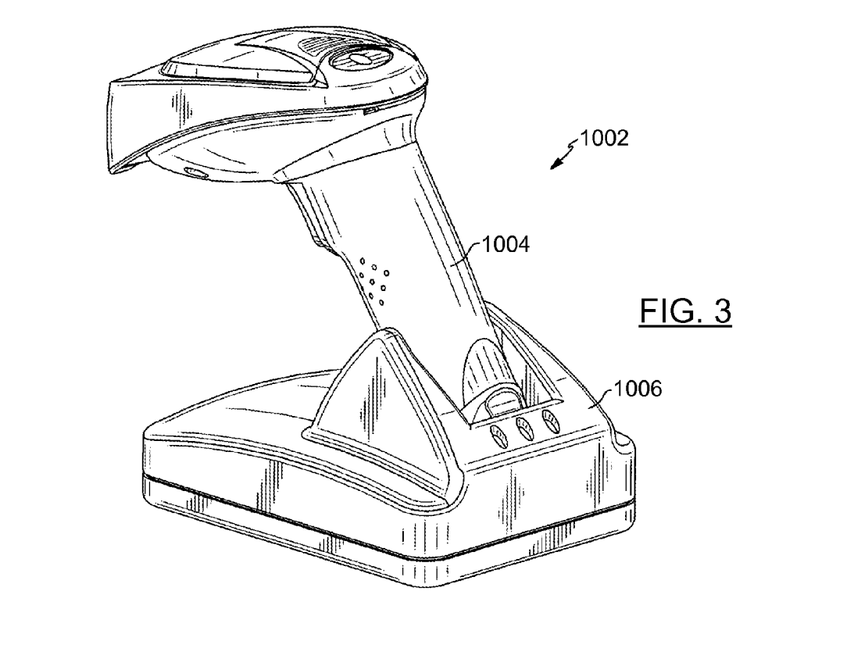
FIG. 3 is another perspective view of the bar code reading terminal of FIG. 2.

According to one embodiment of the present invention, as shown in FIGS. 2 and 3, the bar code reading terminal 1002 includes the hand held optical reader 1004 and the base unit 1006. The hand held optical reader 1004 can be any device capable of reading optical indicia, such as bar code symbols, including linear, two dimensional, and matrix, and may be in the form of an optical scanner or imager. Examples of optical indicia include PDF417, MicroPDF417, MaxiCode, Data Matrix, QR Code, Aztec, Aztec Mesas, Code 49, EAN-UCC Composite, Snowflake, Dataglyphs, Code 39, Code 128, Codabar, UPC, EAN, Interleaved 2 of 5, Reduced Space Symbology, Code 93, Codablock F, and BC412, Postnet, Planet Code, British Post, Canadian Post, Japanese Post, KIX (Netherlands) Post, OCR-A, and OCR-B.

Figure 4:
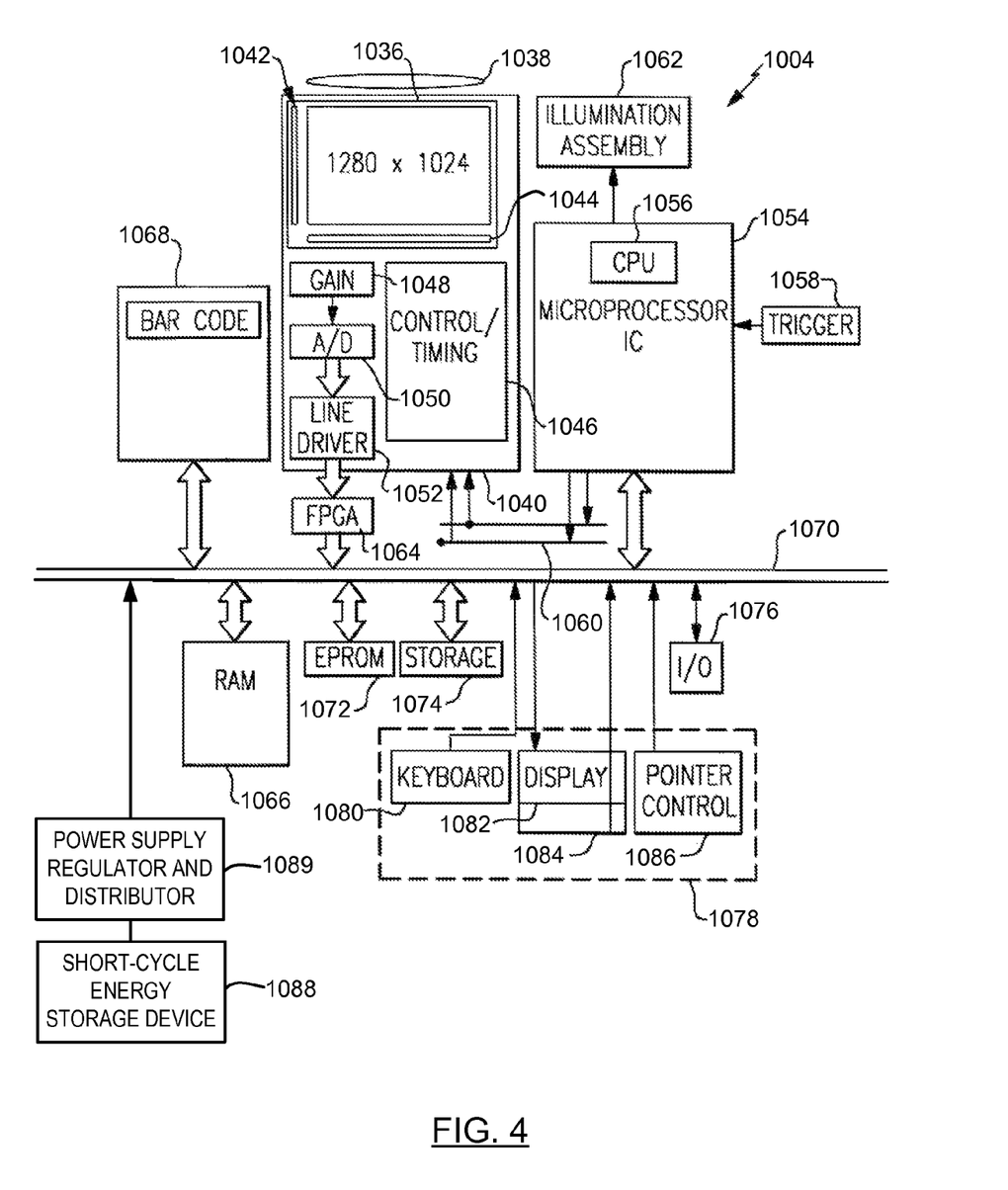
FIG. 4 is a block electrical diagram showing a hand held optical reader according to one embodiment of the present invention.

Referring to FIG. 4, there is shown a system block diagram for the internal components of the hand held optical reader 1004. It will be appreciated by those of ordinary skill in the art that although the hand held optical reader 1004 is described as separate functional components, the functions of any of the separate components may be combined. The hand held optical reader 1004 includes a scan engine 1035 (FIG. 2) for decoding optical indicia. The scan engine is an optical reader that may be a laser scanning engine, e.g., such as may be provided by an MS-3 Laser Scanner OEM Module available from MICROSCAN, or an image capture device. In the disclosed embodiment, the scan engine 1035 is an image capture device comprising an image sensor array 1036 and a lens 1038 for focusing an image of a substrate bearing a bar code onto the image sensor array 1036. In the specific embodiments shown, image sensor array 1036 is provided by a CMOS image sensor array. However, image sensor array 1036 could be of another type such as a CCD image sensor array or a CID array. Image sensor array 1036 can include a plurality of pixels formed in a plurality of rows and columns of pixels. In the specific embodiment shown, the image sensor array has a pixel array of 1280×1024 pixels. The image sensor array 1036 can be a color image sensor array having a Bayer pattern filter applied over the pixels of the image sensor array. In another embodiment the image sensor array 1036 could be a linear image sensor array having an array of e.g., 1280×1 pixels or 1280×2 pixels. Referring to further aspects of image sensor array 1036, image sensor array can be formed on image sensor integrated circuit 1040 which includes among other elements row circuitry 1042, column circuitry 1044 including readout circuitry, timing and control circuitry 1046, gain circuitry 1048, A/D converter 1050, and line driver 1052.

Image sensor integrated circuit 1040 in one embodiment operates under the control of microprocessor integrated circuit (IC) 1054 including operating central processing unit (CPU) 1056. In response to receipt of a trigger signal as may be initiated by depressing trigger 1058, microprocessor IC 1054 can send a frame capture initiation command over $I^2C$ bus 1060 to image sensor integrated circuit 1040. Timing and control circuit control circuitry 1046 can interpret such a command and can send various exposure, readout and reset signals and other timing and control signals to image sensor array 1036. Also in response to a trigger signal being initiated, an illumination assembly 1062 can illuminate a substrate e.g., substrate 1008 (FIG. 1) subject to bar code decoding. In response to receipt of the signals from pixels of image sensor array, the signals are read out, amplified by gain block 1048, digitized by A/D converter 1050, and sent to line driver 1052. Pixel values can be output from image IC 1040 pixel by pixel and row by row until a frame of image data comprising rows sensor and columns of pixels are output. Hand held optical reader 1004 can include field programmable gate array (FPGA) 1064 performing a direct memory access (DMA) function to transfer image data output from image sensor IC 1040 to random access memory (RAM) 1066. When microprocessor IC 1054 has captured a frame of image data into RAM 1066, the microprocessor can further process the image data for decoding of bar codes. While in the embodiment shown, bar code reading terminal 1002 includes a single microprocessor IC for receiving inputs and outputs and for decoding of bar codes. Hand held optical reader 1004 can include a separate decode processor IC that is interfaced to processor IC 1054. In addition or in place of having the bar code reading unit including the elements 1038, 1040, 1054, and 1066, optical reader 1004 can include an encoded information unit 1068 connected to system bus 1070 for access by microprocessor IC 1054.

Referring to further aspects of hand held optical reader 1004, optical reader 1004 can include a program memory such as erasable programmable read only memory (EPROM) 1072 and a storage memory 1074 such as a hard drive. Hand held optical reader 1004 can also include an I/O interface 1076 such an Ethernet or USB interface. Various component of hand held optical reader 1004 can be in communication via system bus 1070. Hand held optical reader 1004 can also include an optional user interface block 1078 including such elements as keyboard 1080, display 1082 having touch screen overlay 1084, and pointer controller 1086. In some embodiments however, optical reader 1004 can be provided in a form without a display 1082. Provisioning an optical reader 1004 to be devoid of a display 1082 allows the terminal to be made at a lower cost and with greater durability. Operators may better focus on reading bar codes using display-less terminals without being distracted by displays of a terminal. In other embodiments it is highly useful to incorporate a display on the hand held optical reader 1004.

The hand held optical reader 1004 may be powered by a short-cycle rechargeable energy storage device 1088, such as, for example an electrochemical double layer capacitor (EDLC), which can be a supercapacitor or ultracapacitor. The short-cycle energy storage device 1088 may be characterized as a high power density, low energy density device. Power density combines the energy density with the speed that the energy can be delivered to the load. By way of comparison, batteries typically have high energy density and low power density. EDLCs have much higher power density than conventional batteries, but at the present time, low energy density.

One practical aspect of this difference may be observed in relation to charging and discharging times. Batteries, which are based on the movement of charge carriers in a liquid electrolyte, have relatively slow charge and discharge times. EDLCs, on the other hand, can be charged or discharged rapidly, typically at a rate that is limited by current heating of the electrodes. As a result, EDLCs have energy densities that are about one-tenth that of a conventional battery, but their power density is generally 10 to 100 times as great. In one example, the short-cycle energy storage device 1088 may have an energy density in the range of 0.5-30 W-hr/kg and a power density greater than 1 kW/kg. In another example, the short-cycle energy storage device 1088 may have an energy density in the range of 0.5-6 W-hr/kg. By way of comparison, a conventional battery may have an energy density in the range of 40-600 W-hr/kg and a power density less than 0.5 kW/kg.

The short-cycle energy storage device 1088 may be tailored to the specific tasks and functions of the bar code reader. For example, since the hand held optical reader 1004 is not wireless, there are no large bursts of power required for data transmission from a transceiver to the base unit 1006. Thus, the energy storage requirements may be relatively small as compared to wireless hand sets. Also, since the energy storage device 1088 may be rapidly recharged from the base unit 1006 (discussed below), power requirements may only need to be sufficient to carry out a limited number of bar code scans and decodes. Accordingly, the short-cycle energy storage device 1088 may be manufactured as a light-weight unit as compared to conventional batteries used in wireless bar code readers. A light-weight unit helps alleviate operator fatigue and offers new, smaller design options. In one embodiment, the short-cycle energy storage device 1088 may weigh less than 5 grams, as compared to a conventional battery which may weigh more than one hundred times that amount. In one example, the energy storage device 1088 may be a 5 farad ultracapacitor such as the BCAP0005 P270 series available from Maxwell Technologies of San Diego, Calif. The BCAP0005 P270 energy storage device 1088 has a power density of 7,500 W/kg at 2.85 volts, an energy density of 2.3 W-hr/kg, and weighs only 2.2 grams.

Another advantage of electrochemical double layer capacitors is that, unlike conventional rechargeable batteries, they exhibit little degradation over hundreds of thousands of charge cycles. For example, a typical EDLC may be recharged over one million times, as compared to 200 to 1000 recharge cycles for most commercially available rechargeable batteries. Also, because rechargeable batteries typically wear out over a few years, their highly reactive chemical electrolytes present a disposal and safety hazard. Accordingly, the short-cycle energy storage device 1088 of the present invention may last for the entire lifetime of the hand held optical reader 1004, which decreases the life-cycle cost of the bar code reading terminal 1002 and makes the bar code reading terminal environmentally friendly.

In one embodiment, the short-cycle energy storage device 1088 is electrically connected to a power supply regulator and distributor 1089, which is then connected to the control circuitry 1046 and the central processing circuitry 1054. Power can then be supplied to the other elements via the control circuitry 1046 and the central processing circuitry 1054. Alternatively, the power supply regulator and distributor 1089 can be directly connected to the additional elements.

The random access memory 1066 of the hand held optical reader 1004 may also be tailored to the limited tasks and functions of the bar code reader. For example, in one embodiment the memory 1066 may be configured to store a limited number of decoded bar code symbol 1008. The symbols are not presented to the price lookup table 2034 (FIG. 1) until the hand held optical reader 1004 is engaged with the base unit 1006.

Figure 5:
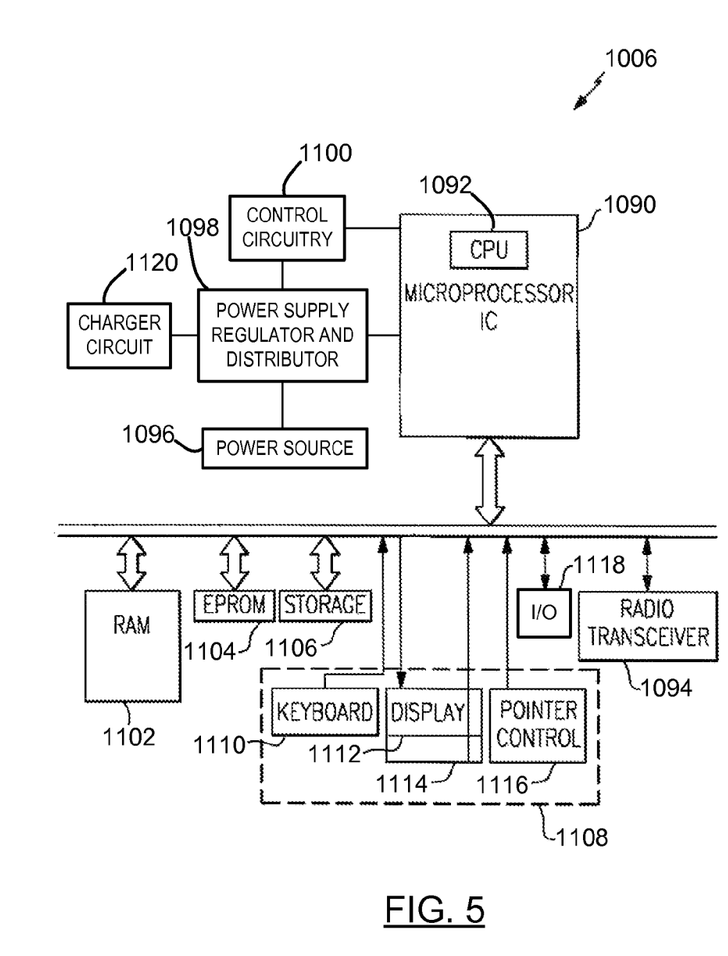
FIG. 5 is a block electrical diagram showing a base unit according to one embodiment of the present invention.

Referring to FIG. 5, there is shown a system block diagram for the internal components of the base unit 1006. It will be appreciated by those of ordinary skill in the art that although the base unit 1006 is described as separate functional components, the functions of any of the separate components may be combined. In one embodiment the base unit 1006 operates under the control of microprocessor integrated circuit 1090 including operating central processing unit (CPU) 1092.

The base unit 1006 further includes a radio transceiver 1094, such as, for example a wireless Bluetooth, the IEEE 802.11 family, or other standardized or proprietary RF device. The radio transceiver 1094 includes an RF module and antenna and is configured to engage in two-way communication with at least one other wireless transceiver, which in one embodiment is the radio transceiver 2018 located in the cash register 2012 as shown in FIG. 1.

The base unit 1006 is powered by a power source 1096, such as, for example a AC source from a wall receptacle (e.g., 120VAC) or can be powered by a host device. In the illustrated embodiment, the external power source 1096 is connected to a power supply regulator and distributor 1098, which is then connected to control circuitry 1100 and the microprocessor 1090. Power can then be supplied to the other elements via the control circuitry 1100 and the microprocessor 1090. Alternatively, the power supply regulator and distributor 1098 can be directly connected to the additional elements.

The base unit 1006 further includes electronic memory for storing operating instructions. The memory may, for example, include base RAM 1102, base EPROM 1104, or base storage memory 1106 such as a hard drive. As will be appreciated by those of ordinary skill in the electrical arts, the forgoing examples of memory types are illustrative of the types of memory that may be used in the present invention and are in no way limiting to the scope of the invention and that other suitable memory types may be used depending upon the applicable design criteria without the need for undue experimentation.

The base unit 1006 may further include a user interface/accessory bus 1108. The user interface 1108 may include such elements as a keyboard 1110, display 1112 having touch screen overlay 1114, and base pointer controller 1116, or any combination thereof. In addition, the base unit 1006 includes a communications interface 1118 (e.g., RS-232 port or USB port), allowing for communications between the base unit 1006 and a host device. In one embodiment shown in FIG. 1, the base unit 1006 is coupled to the cash register 2012 by electrical cabling 2016. The electrical cabling 2016 is connected to a communications port of the cash register 2012. The electrical cabling 2016 includes data communication lines and may also include power lines to provide the external power source power source 1096.

The base unit 1006 further includes a charger circuit 1120 for recharging the short-cycle energy storage device 1088 of the hand held optical reader 1004. The charger of the base unit 1006 may be a contact type charger or an inductive type charger. In one embodiment, the power management circuitry in the hand held optical reader 1004 controls the operation of the charger circuit 1120.

Figure 6:
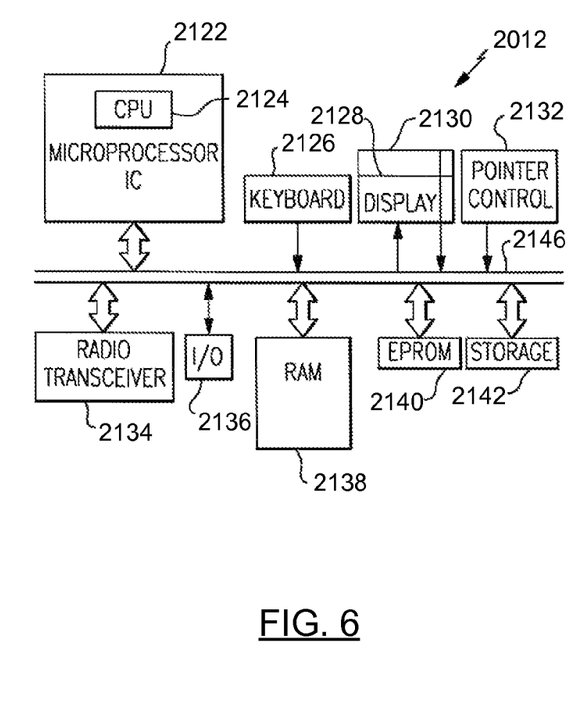
FIG. 6 is a block electrical diagram showing a host device according to one embodiment of the present invention.

A block diagram of the cash register 2012 is shown in FIG. 6. Cash register 2012 can include a microprocessor IC 2122 having a CPU 2124, a keyboard 2126, a display 2128, a touch screen overlay 2130, a pointer controller 2132, a radio transceiver 2134 as described previously, an I/O interface 2136, a working memory or RAM 2138, a program memory 2140 such as may be provided by EPROM, and storage memory 2142, e.g., a hard drive. The cash register 2012 can also include a cash drawer 2144 as is indicated in the view of FIG. 1. The components can be in communication via register system bus 2146. The cash register 2012 can incorporate a real time operating system such as WINDOWS 7 supporting advance applications and GUI functionality and can incorporate the TCP/IP protocol stack. Cash register 2012 can incorporate a common PC based platform.

Figure 7:
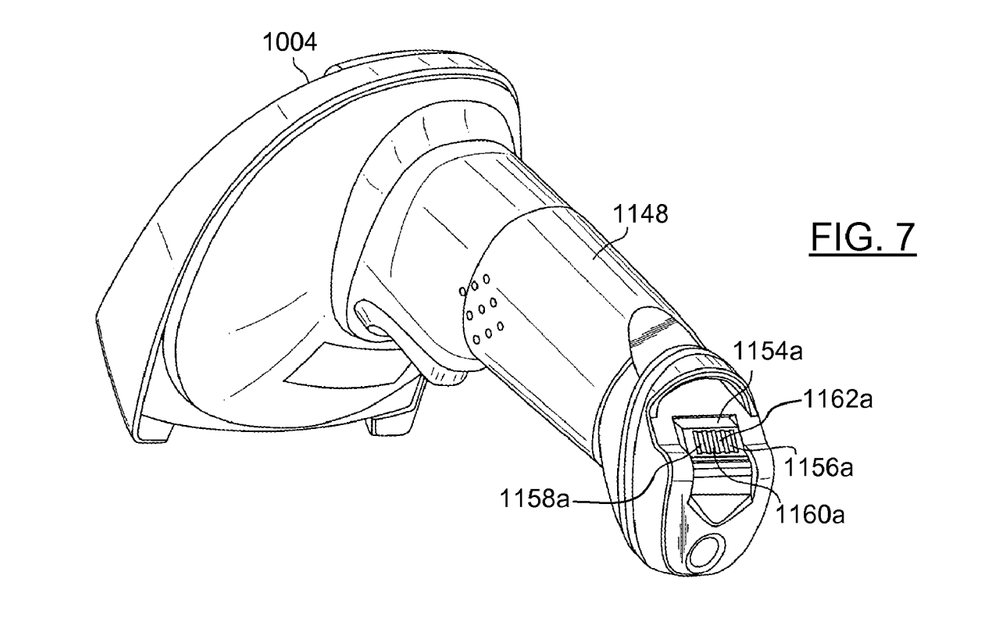
FIG. 7 is a perspective view of the hand held optical reader of FIG. 1 according to the present invention showing its mating connector.
Figure 8:
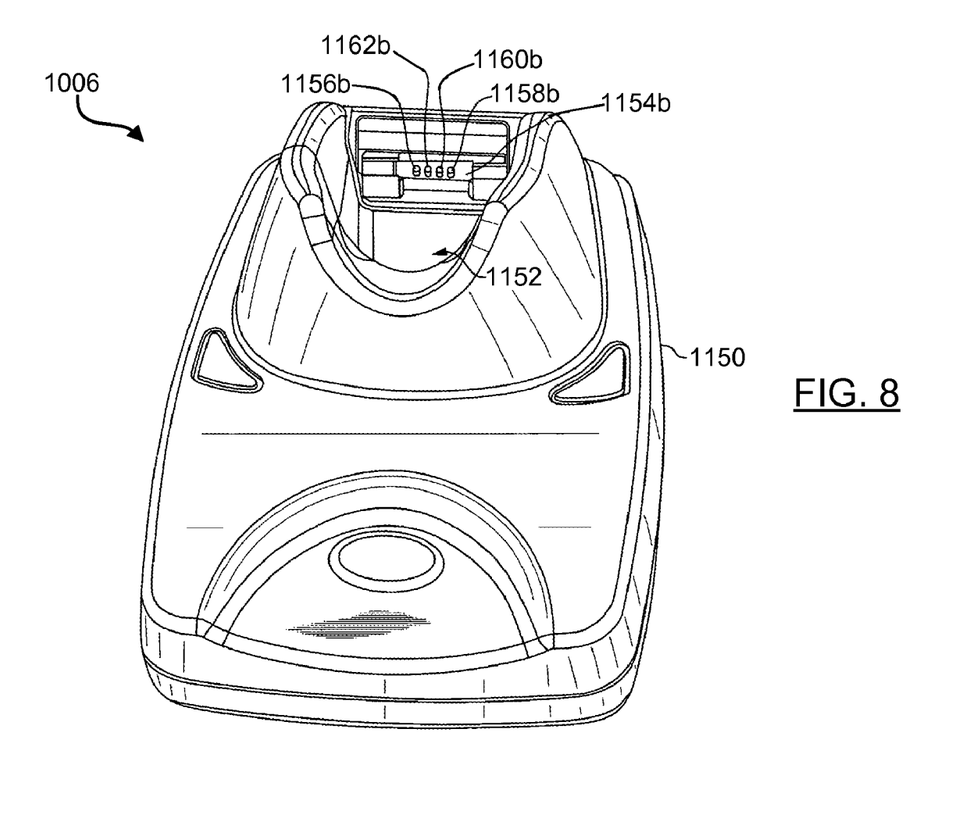
FIG. 8 is a perspective view of the base unit of FIG. 1 according to the present invention showing its mating connector.

As shown in FIGS. 7 and 8, the base unit 1006 can be a docking cradle capable of charging the hand held optical reader 1004 or other device providing access to a host device. A housing 1148 of the hand held optical reader 1004 and a housing 1150 of the base unit 1006 may be complementarily shaped and configured so that the optical reader is received and supported by the base unit. More specifically, in one embodiment of the present invention, the lower portion of the handle of the optical reader 1004 is shaped and configured to be inserted into a complementarily sized socket 1152 of the base unit 1006, which can then support and hold the optical reader 1004. For example, the housing of the optical reader 1004 can be constructed so as to ensure that it forms a friction fit connection with the base unit 1006 when inserted into the socket.

The hand held optical reader 1004 may be equipped with a connector 1154*a* for connecting the hand held optical reader to the complementary or mating connector 1154*b* of the base unit 1006. The connection 1154 between the hand held optical reader connector 1154*a* and base unit connector 1154*b* may be, for example an RS-232 interface, an RS-422 interface, or a magnetic induction interface. As shown in FIGS. 7 and 8, both the hand held optical reader connector 1154*a* and the base unit connector 1154*b* are placed toward the rear portions on the devices in such a way so as to take advantage of effect of gravity on the optical reader 1004, which will tend to lean forward when it is docked in the base unit 1006. This leaning forward causes the two connectors to be in more solid contact due to their rear placement.

Figure 9:
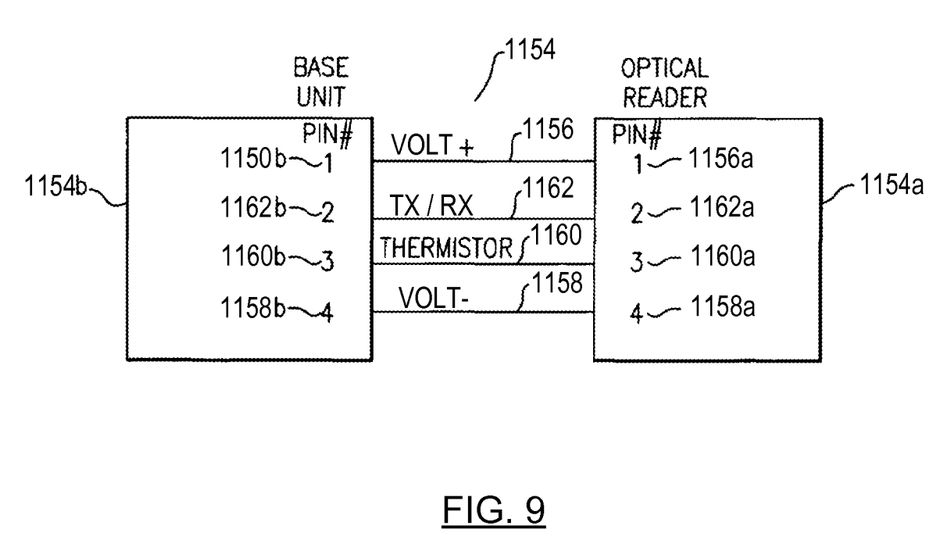
FIG. 9 is a diagram of the connection between the hand held optical reader connector and base unit connector of FIGS. 7 and 8 according to the present invention.

In one embodiment, the connection 1154 includes the mating of two, four-pin connectors as shown in FIG. 9. Pin 1 (VOLT+) 1156 and Pin 4 1158 (VOLT−) of the connection are dedicated to providing electrical power from the base unit 1006 to charge the short-cycle energy storage device 1088 of the hand held optical reader 1004. Pin 3 1160 (THER- MISTOR) of the connection 1154 monitors the temperature of the energy storage device 1088 in the hand held optical reader 1004, providing input to the power management circuitry in the hand held optical reader's control circuitry 1046, which controls the charging of the energy storage device 1088. Pin 2 (TX/RX) 1162 of the connection 1154 is used by the base unit 1006 to sense the presence of the hand held optical reader 1004 and exchange information between the base unit and the hand held optical reader, such as decoded bar code information.

In one application of the present invention, the hand held optical reader 1004 permits an operator to scan items far away from the base unit, as may be required when scanning very large items in a retail store. This allows greater flexibility and ease-of-use than conventional corded scanners, which limit the operator's reach based on the length of the cord. The short-cycle energy storage device 1088 within the optical reader 1004 may be adapted to provide sufficient power to scan several items before necessitating insertion into the base unit 1006. In this manner, the bar code reading terminal 1002 may be adapted to operate for brief periods of time before requiring recharge. In one example, the bar code reading terminal 1002 may require a recharge after five minutes of use. In another example, the bar code reading terminal 1002 may require a recharge after scanning approximately five items. In any event, the bar code reading terminal 1002 may recharge quickly, for example, in under ten seconds. In another example, the bar code reading terminal 1002 may recharge in under five seconds. In yet another example, the bar code reading terminal 1002 may recharge in under two seconds. Since the optical reader 1004 only needs to be self-powered for a few minutes at a time, it does not require significant energy storage, and with the short-cycle energy storage device 1088 it can charge very quickly and be ready for the next customer without delay.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

I claim:

1. A bar code reading terminal comprising:
a cordless hand held optical reader comprising a microprocessor, a scan engine coupled to the microprocessor, a hand held housing supporting the scan engine, program memory coupled to the microprocessor, a decode processor circuit coupled to the microprocessor, and a short-cycle energy storage device coupled to the microprocessor, the energy storage device having high power density and low energy density; and
a base unit comprising a housing including a socket for receiving the hand held housing, the socket having a connector to facilitate transfer of bar code data messages from the hand held optical reader to the base unit, and transfer power from the base unit to the short-cycle energy storage device, the base unit further comprising a charger circuit coupled to the connector.

2. The bar code reading terminal of claim 1, wherein the scan engine is an image capture device having an image sensor array and a lens for focusing an image of a substrate bearing a bar code onto the image sensor array.

3. The bar code reading terminal of claim 1, wherein the short-cycle energy storage device is an electrochemical double layer capacitor.

4. The bar code reading terminal of claim 1, wherein the short-cycle energy storage device comprises a power density greater than 1 kW/kg.

5. The bar code reading terminal of claim 4, wherein the power density is greater than 7 kW/kg.

6. The bar code reading terminal of claim 4, wherein the short-cycle energy storage device comprises an energy density in the range of 0.5-30 W-hr/kg.

7. The bar code reading terminal of claim 6, wherein the energy density is in the range of 0.5-7 W-hr/kg.

8. The bar code reading terminal of claim 1, wherein the short-cycle energy storage device weighs less than 5 grams.

9. The bar code reading terminal of claim 1, wherein the short-cycle energy storage device provides approximately 5 scans before requiring a recharge.

10. The bar code reading terminal of claim 1, wherein the short-cycle energy storage device provides approximately 5 minutes of use before requiring a recharge.

11. The bar code reading terminal of claim 1, wherein the short-cycle energy storage device recharges in less than 10 seconds.

12. The bar code reading terminal of claim 11, wherein the short-cycle energy storage device recharges in less than 5 seconds.

13. The bar code reading terminal of claim 1, wherein power management circuitry in the hand held optical reader controls the operation of the charger circuit in the base unit.

14. A retail store network comprising:
a plurality of point of sale stations, at least one point of sale station comprising a bar code reading terminal, the bar code reading terminal including a hand held optical reader and a base unit, the hand held optical reader comprising a microprocessor, a scan engine coupled to the microprocessor, a hand held housing supporting the scan engine, program memory coupled to the microprocessor, a decode processor circuit coupled to the microprocessor, and a short-cycle energy storage device coupled to the microprocessor, the short-cycle energy storage device comprising a power density greater than 1 kW/kg, the base unit comprising a housing including a socket for receiving the hand held housing, the socket having a connector to facilitate transfer of bar code data messages from the hand held optical reader to the base unit, and transfer power from the base unit to the short-cycle energy storage device, the base unit further comprising a charger circuit coupled to the connector;
a host device coupled to the base unit of the bar code reading terminal, the host device configured to accept decoded message data from the base unit;
a server coupled to the host device through a network backbone for processing the decoded message data; and
a price lookup table coupled to the server to associate pricing with the decoded message data.

15. The retail store network of claim 14, wherein the host device is a cash register, and the retail store network further includes a transaction terminal coupled to the cash register.

16. The retail store network of claim 14, wherein the base unit of the bar code reading terminal and the host device further comprise a radio transceiver to exchange information wirelessly.

17. The retail store network of claim 14, wherein the short-cycle energy storage device is an electrochemical double layer capacitor.

18. The retail store network of claim 14, wherein the short-cycle energy storage device is recharged by the base unit in less than 10 seconds.

19. The retail store network of claim 14, wherein the short-cycle energy storage device comprises a power density greater than 7 kW/kg.

20. The retail store network of claim 14, wherein the scan engine of the hand held optical reader is an image capture device having an image sensor array and a lens for focusing an image of a substrate bearing a bar code onto the image sensor array.

* * * * *